(12) United States Patent
Schlicht et al.

(10) Patent No.: US 12,096,167 B2
(45) Date of Patent: Sep. 17, 2024

(54) BIDIRECTIONAL CONFIGURATION OF SENSOR NODES WITH MOBILE PHONE WITH NO EXTENSION

(71) Applicant: Fraunhofer-Gesellschaft zur Foerderung der angewandten Forschung e.V., Munich (DE)

(72) Inventors: Michael Schlicht, Erlangen (DE); Josef Bernhard, Erlangen (DE); Gerd Kilian, Erlangen (DE); Dominik Soller, Erlangen (DE); Alexej Jarresch, Erlangen (DE); Stefan Ereth, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 373 days.

(21) Appl. No.: 17/388,889

(22) Filed: Jul. 29, 2021

(65) Prior Publication Data
US 2021/0360339 A1    Nov. 18, 2021

Related U.S. Application Data (63) Continuation of application No. PCT/EP2020/052105, filed on Jan. 29, 2020.

(30) Foreign Application Priority Data

Jan. 30, 2019    (DE) .......................... 102019201152.7

(51) Int. Cl.
*H04B 5/00* (2024.01)
*H04L 27/10* (2006.01)
(Continued)

(52) U.S. Cl.
CPC ................. *H04R 1/02* (2013.01); *H04B 5/00* (2013.01)

(58) Field of Classification Search
None
See application file for complete search history.

(56) References Cited

U.S. PATENT DOCUMENTS 2,381,097 A    8/1945    Adams
3,098,220 A    7/1963    de Graaf
(Continued)

FOREIGN PATENT DOCUMENTS

CH    365640 A    11/1962
CN    1967940 A    5/2007
(Continued)

OTHER PUBLICATIONS

"Premo, RFID Transponder Inductors",.
(Continued)

*Primary Examiner* — Pablo N Tran
(74) *Attorney, Agent, or Firm* — Perkins Coie LLP; Michael A. Glenn (57) ABSTRACT

Embodiments provide a method for transmitting data between a user terminal and another apparatus. The method has a step of generating a signal for driving an electromagnetic functional unit, the electromagnetic functional unit being an actuator of a loudspeaker of the user terminal or the electromagnetic functional unit being an electromagnetic oscillating circuit connected to the user terminal. Additionally, the method has a step of driving the electromagnetic functional unit by the generated signal to produce, by the electromagnetic functional unit, a magnetic signal which carries first data to be transmitted from the user terminal to the other apparatus. Additionally, the method has a step of detecting another signal output by the other apparatus, the
(Continued)

other signal carrying second data to be transmitted from the other apparatus to the user terminal. Thus, the magnetic signal and the other signal differ in the physical signal type.

12 Claims, 5 Drawing Sheets

(51) Int. Cl.
*H04R 1/02* (2006.01)
*H04R 3/00* (2006.01)
*H04R 9/06* (2006.01)
*H04R 9/08* (2006.01)

(56) References Cited

U.S. PATENT DOCUMENTS

| | | | |
|---|---|---|---|
| 3,764,746 A | 10/1973 | Libby | |
| 4,415,769 A | 11/1983 | Gray | |
| 5,684,837 A | 11/1997 | Chen | |
| 5,887,176 A | 3/1999 | Griffith et al. | |
| 6,593,845 B1 | 7/2003 | Friedman et al. | |
| 6,636,146 B1 | 10/2003 | Wehoski | |
| 6,870,475 B2 | 3/2005 | Fitch et al. | |
| 7,254,366 B2 * | 8/2007 | Palermo | H02J 50/10 455/66.1 |
| 7,307,521 B2 | 12/2007 | Funk et al. | |
| 7,574,173 B2 | 8/2009 | Terranova et al. | |
| 7,750,435 B2 | 7/2010 | Rofougaran | |
| 7,808,389 B2 | 10/2010 | Finkenzeller | |
| 7,831,205 B2 | 11/2010 | Jack et al. | |
| 7,903,041 B2 | 3/2011 | Levan | |
| 8,174,360 B2 | 5/2012 | Finkenzeller | |
| 8,188,854 B2 | 5/2012 | Yamashita | |
| 8,190,086 B2 | 5/2012 | Sasaki et al. | |
| 8,240,562 B2 | 8/2012 | Washiro | |
| 8,254,990 B2 | 8/2012 | Hawker et al. | |
| 8,413,895 B2 | 4/2013 | Ota et al. | |
| 8,437,695 B2 | 5/2013 | Chatterjee et al. | |
| 8,532,570 B2 | 9/2013 | Fukami et al. | |
| 8,538,332 B2 | 9/2013 | Huomo et al. | |
| 8,611,817 B2 | 12/2013 | Kalanithi et al. | |
| 8,643,473 B2 | 2/2014 | Suzuki | |
| 8,675,908 B2 | 3/2014 | Pierce et al. | |
| 8,711,656 B1 | 4/2014 | Paulson | |
| 8,744,520 B2 | 6/2014 | Maeda | |
| 8,909,162 B2 | 12/2014 | Ilkov et al. | |
| 8,915,428 B1 | 12/2014 | Post | |
| 9,001,881 B2 | 4/2015 | Okamura et al. | |
| 9,022,285 B2 | 5/2015 | Graylin | |
| 9,048,884 B2 | 6/2015 | Levan | |
| 9,065,488 B2 | 6/2015 | Kim et al. | |
| 9,071,289 B2 | 6/2015 | Mcfarthing | |
| 9,142,997 B2 | 9/2015 | Kim et al. | |
| 9,160,417 B2 | 10/2015 | Kim et al. | |
| 9,166,439 B2 | 10/2015 | Low et al. | |
| 9,167,377 B2 | 10/2015 | Clarke | |
| 9,225,568 B1 | 12/2015 | Mei et al. | |
| 9,240,827 B2 | 1/2016 | Brockenbrough et al. | |
| 9,287,735 B2 | 3/2016 | Ryu et al. | |
| 9,306,626 B2 | 4/2016 | Hall et al. | |
| 9,379,784 B2 | 6/2016 | Dhayni | |
| 9,401,768 B2 * | 7/2016 | Inha | H04B 5/24 |
| 9,413,432 B2 | 8/2016 | Huh et al. | |
| 9,455,771 B2 | 9/2016 | Dobyns | |
| 9,608,327 B1 | 3/2017 | Tai et al. | |
| 9,673,866 B2 | 6/2017 | Ikeda | |
| 9,716,967 B2 | 7/2017 | Takeuchi | |
| 9,787,364 B2 | 10/2017 | Moore et al. | |
| 9,793,961 B2 | 10/2017 | Charrat | |
| 9,812,254 B2 | 11/2017 | Wakabayashi | |
| 9,831,924 B2 | 11/2017 | Lin | |
| 9,846,796 B2 | 12/2017 | Rezayee | |
| 9,859,950 B2 | 1/2018 | Shao et al. | |
| 9,872,109 B2 * | 1/2018 | Miller | H04R 31/006 |
| 9,893,570 B2 | 2/2018 | Beyer et al. | |
| 9,894,468 B2 | 2/2018 | Brown et al. | |
| 9,912,174 B2 | 3/2018 | Soar | |
| 9,965,411 B2 | 5/2018 | Hall | |
| 10,009,069 B2 | 6/2018 | Kerselaers et al. | |
| 10,038,476 B2 | 7/2018 | Kim et al. | |
| 10,039,084 B2 | 7/2018 | Bernhard et al. | |
| 10,050,677 B1 | 8/2018 | Thoen | |
| 10,074,837 B2 | 9/2018 | Miller et al. | |
| 10,177,900 B2 | 1/2019 | Michel et al. | |
| 10,263,470 B2 | 4/2019 | Joye et al. | |
| 10,270,168 B2 | 4/2019 | Kanno | |
| 10,332,676 B2 | 6/2019 | Teggatz et al. | |
| 10,360,485 B2 | 7/2019 | Liu et al. | |
| 10,367,265 B2 | 7/2019 | Richardson et al. | |
| 10,430,701 B2 | 10/2019 | Lee et al. | |
| 10,439,449 B2 | 10/2019 | Alonso et al. | |
| 10,461,812 B2 | 10/2019 | Zhou et al. | |
| 10,476,553 B2 | 11/2019 | Qiu et al. | |
| 10,511,349 B2 | 12/2019 | Kahlman | |
| 10,574,297 B2 | 2/2020 | Moore et al. | |
| 10,593,470 B1 | 3/2020 | Lekas et al. | |
| 10,630,073 B2 | 4/2020 | Taya | |
| 10,666,325 B2 | 5/2020 | Zhou et al. | |
| 10,715,935 B2 * | 7/2020 | Andersen | H04R 25/505 |
| 10,720,964 B2 | 7/2020 | Woerlee et al. | |
| 10,811,913 B2 | 10/2020 | Qiu et al. | |
| 11,050,299 B2 | 6/2021 | Kanto et al. | |
| 11,757,490 B2 * | 9/2023 | Kilian | H04B 5/24 455/41.1 |
| 2005/0237160 A1 | 10/2005 | Nolan et al. | |
| 2007/0060221 A1 | 3/2007 | Burgan et al. | |
| 2008/0173717 A1 | 7/2008 | Antebi et al. | |
| 2009/0060243 A1 * | 3/2009 | Michaelis | H04R 25/554 381/331 |
| 2010/0081379 A1 * | 4/2010 | Cooper | H01Q 7/00 455/41.1 |
| 2011/0031928 A1 * | 2/2011 | Soar | H04B 5/72 320/108 |
| 2011/0050164 A1 | 3/2011 | Partovi et al. | |
| 2011/0140852 A1 | 6/2011 | Wuidart | |
| 2011/0300801 A1 | 12/2011 | Kerselaers | |
| 2011/0309687 A1 | 12/2011 | Bohori et al. | |
| 2012/0007442 A1 | 1/2012 | Rhodes et al. | |
| 2012/0071089 A1 | 3/2012 | Charrat et al. | |
| 2013/0094680 A1 | 4/2013 | Allen et al. | |
| 2013/0127259 A1 | 5/2013 | Lohr et al. | |
| 2013/0143486 A1 | 6/2013 | Zhu et al. | |
| 2013/0147281 A1 | 6/2013 | Kamata | |
| 2013/0217334 A1 | 8/2013 | Yu et al. | |
| 2013/0281016 A1 | 10/2013 | Mcfarthing | |
| 2013/0295845 A1 | 11/2013 | Maenpaa | |
| 2014/0080412 A1 | 3/2014 | Kang et al. | |
| 2014/0343703 A1 | 11/2014 | Topchy et al. | |
| 2014/0369170 A1 | 12/2014 | Inha et al. | |
| 2015/0035374 A1 | 2/2015 | Park et al. | |
| 2015/0041534 A1 | 2/2015 | Rayner et al. | |
| 2015/0115735 A1 | 4/2015 | Singh et al. | |
| 2015/0155918 A1 | 6/2015 | Van Wageningen | |
| 2015/0349896 A1 | 12/2015 | Post et al. | |
| 2016/0049800 A1 | 2/2016 | Tanaka et al. | |
| 2016/0057542 A1 | 2/2016 | Pasek | |
| 2016/0124573 A1 | 5/2016 | Rouaissia et al. | |
| 2016/0156387 A1 | 6/2016 | Ota | |
| 2016/0276877 A1 | 9/2016 | Weale | |
| 2017/0041715 A1 | 2/2017 | Jumani et al. | |
| 2017/0070080 A1 | 3/2017 | Kang et al. | |
| 2017/0117879 A1 | 4/2017 | Chakraborty et al. | |
| 2017/0118714 A1 | 4/2017 | Kaechi | |
| 2017/0141604 A1 | 5/2017 | Park et al. | |
| 2017/0187245 A1 | 6/2017 | Uchida | |
| 2017/0188129 A1 | 6/2017 | Sindia et al. | |
| 2017/0213831 A1 | 7/2017 | Nakai | |
| 2017/0256989 A1 | 9/2017 | Yoshii | |
| 2017/0289671 A1 | 10/2017 | Patel et al. | |
| 2017/0352951 A1 | 12/2017 | Lee | |
| 2018/0083670 A1 | 3/2018 | Nakano et al. | |
| 2018/0108994 A1 | 4/2018 | Lee | |
| 2018/0132019 A1 | 5/2018 | Riedel et al. | |

(56) References Cited

U.S. PATENT DOCUMENTS

| | | | |
|---|---|---|---|
| 2018/0143223 A1 | 5/2018 | Taya | |
| 2018/0181952 A1 | 6/2018 | Enriquez et al. | |
| 2018/0187447 A1 | 7/2018 | Gharabegian | |
| 2018/0324915 A1 | 11/2018 | Luccato | |
| 2018/0364310 A1 | 12/2018 | Taya | |
| 2019/0036347 A1 | 1/2019 | Arasaki et al. | |
| 2019/0208336 A1 | 7/2019 | Andersen et al. | |
| 2020/0019955 A1 | 1/2020 | Lee et al. | |
| 2020/0076474 A1 | 3/2020 | Daga et al. | |
| 2020/0143611 A1 | 5/2020 | Shin et al. | |
| 2020/0169299 A1 | 5/2020 | Latham et al. | |
| 2020/0274404 A1 | 8/2020 | Sankar | |
| 2021/0152216 A1 | 5/2021 | Kilian et al. | |
| 2021/0175929 A1* | 6/2021 | Kilian | H04R 9/06 |
| 2022/0060218 A1* | 2/2022 | Kneißl | H04B 5/72 |

FOREIGN PATENT DOCUMENTS

| | | |
|---|---|---|
| CN | 101900613 B | 7/2012 |
| CN | 202617115 U | 12/2012 |
| CN | 203014937 U | 6/2013 |
| CN | 103187999 A | 7/2013 |
| CN | 103825661 A | 5/2014 |
| CN | 102957454 B | 12/2014 |
| CN | 204442353 U | 7/2015 |
| CN | 103187998 B | 8/2015 |
| CN | 103187993 B | 11/2015 |
| CN | 105591675 A | 5/2016 |
| CN | 103187984 B | 9/2016 |
| CN | 106019955 A | 10/2016 |
| CN | 106233802 A | 12/2016 |
| CN | 104158305 B | 1/2017 |
| CN | 106452510 A | 2/2017 |
| CN | 206302413 U | 7/2017 |
| CN | 107102724 A | 8/2017 |
| CN | 107154682 A | 9/2017 |
| CN | 107437961 A | 12/2017 |
| CN | 107852548 A | 3/2018 |
| CN | 108259069 A | 7/2018 |
| CN | 109586768 A | 4/2019 |
| CN | 107852548 B | 4/2020 |
| CN | 111092636 A | 5/2020 |
| DE | 102011082098 A1 | 3/2013 |
| DE | 102011115092 A1 | 4/2013 |
| DE | 102013227141 A1 | 6/2015 |
| DE | 202017102047 U1 | 7/2017 |
| DE | 102018212957 B3 | 1/2020 |
| DE | 102018214716 A1 | 3/2020 |
| DE | 102019201152 B3 | 6/2020 |
| DE | 102019206848 B3 | 8/2020 |
| EP | 0901670 A1 | 3/1999 |
| EP | 1250026 A1 | 10/2002 |
| EP | 0901670 B1 | 7/2004 |
| EP | 1654813 A1 | 5/2006 |
| EP | 1688016 A1 | 8/2006 |
| EP | 1688016 B1 | 9/2007 |
| EP | 1654813 B1 | 11/2007 |
| EP | 1869842 A1 | 12/2007 |
| EP | 1981176 A1 | 10/2008 |
| EP | 2023661 A1 | 2/2009 |
| EP | 2119029 A1 | 11/2009 |
| EP | 2159929 A2 | 3/2010 |
| EP | 2211579 A1 | 7/2010 |
| EP | 2347522 A1 | 7/2011 |
| EP | 2367824 A1 | 9/2011 |
| EP | 2579554 A1 | 4/2013 |
| EP | 2625653 A2 | 8/2013 |
| EP | 2688078 A1 | 1/2014 |
| EP | 2740223 A1 | 6/2014 |
| EP | 2773087 A1 | 9/2014 |
| EP | 2777128 A2 | 9/2014 |
| EP | 2625653 B1 | 11/2014 |
| EP | 2347522 B1 | 12/2014 |
| EP | 2119029 B1 | 4/2015 |
| EP | 2338238 B1 | 3/2016 |
| EP | 2777128 B1 | 5/2016 |
| EP | 3022823 A1 | 5/2016 |
| EP | 3022823 B1 | 2/2017 |
| EP | 3161933 A1 | 5/2017 |
| EP | 3168953 A1 | 5/2017 |
| EP | 3312808 A1 | 4/2018 |
| EP | 1869842 B1 | 1/2019 |
| EP | 3427391 A1 | 1/2019 |
| EP | 3480918 A1 | 5/2019 |
| EP | 3427391 B1 | 11/2019 |
| GB | 2441051 A | 2/2008 |
| GB | 2444799 A | 6/2008 |
| JP | H06104957 A | 4/1994 |
| JP | 2003152606 A | 5/2003 |
| JP | 2006121339 A | 5/2006 |
| JP | 2007006123 A | 1/2007 |
| JP | 2010284066 A | 12/2010 |
| JP | 5034850 B2 | 9/2012 |
| JP | 5431033 B2 | 12/2013 |
| JP | 5456625 B2 | 1/2014 |
| JP | 2016192761 A | 11/2016 |
| JP | 6139732 B2 | 5/2017 |
| KR | 20050033764 A | 4/2005 |
| KR | 20110001743 U | 2/2011 |
| KR | 20150114063 A | 10/2015 |
| KR | 20160040484 A | 4/2016 |
| KR | 20160102786 A | 8/2016 |
| KR | 20160122615 A | 10/2016 |
| KR | 101763030 B1 | 7/2017 |
| KR | 101797563 B1 | 11/2017 |
| KR | 101870877 B1 | 6/2018 |
| RU | 2566792 C1 | 10/2015 |
| TW | I281340 B | 5/2007 |
| TW | 201328226 A | 7/2013 |
| WO | 9501678 A1 | 1/1995 |
| WO | 2007135434 A1 | 11/2007 |
| WO | 2008071924 A2 | 6/2008 |
| WO | 2013022207 A1 | 2/2013 |
| WO | 2013097670 A1 | 7/2013 |
| WO | 2014205201 A1 | 12/2014 |
| WO | 2015/096930 A1 | 7/2015 |
| WO | 2015096930 A1 | 7/2015 |
| WO | 2015101120 A1 | 7/2015 |
| WO | 2016037045 A1 | 3/2016 |
| WO | 2016076498 A1 | 5/2016 |
| WO | 2016076736 A1 | 5/2016 |
| WO | 2016153589 A2 | 9/2016 |
| WO | 2016154762 A1 | 10/2016 |
| WO | 2016202284 A1 | 12/2016 |
| WO | 2017036864 A1 | 3/2017 |
| WO | 2017138789 A1 | 8/2017 |
| WO | 2017144387 A1 | 8/2017 |
| WO | 2019172610 A1 | 9/2019 |
| WO | 2020004940 A1 | 1/2020 |
| WO | 2020025450 A1 | 2/2020 |
| WO | 2020043814 A1 | 3/2020 |
| WO | 2020/157098 A1 | 8/2020 |
| WO | 2020157098 A1 | 8/2020 |
| WO | 2020229309 A2 | 11/2020 |

OTHER PUBLICATIONS

Electroniktutor Startseite, "Der Parallelschwingkreis", https://www.elektroniktutor.de/analogtechnik/par_swkr.html,.

Electroniktutor.De, "Parallel Oscillating Circuit", English Translation of Der Parallelschwingkreis, https://elektroniktutor.de/analogtechnik/par_swkr.html,.

ETSI , "Short Range Devices; Low Throughput Networks (LTN); Protocols for radio interface A", ETSI TS 103 357, V1.1.1 (2018-16),, Jun. 2018, 113 pp.

Kollman, Robert, et al., "Pitfalls of using MLCCs", English translation of "Fallstricke beim Ensatz von MLCCs" from Analog-Praxis.de https://www.analog-praxis.de/fallstricke-beim-einsatz-von-mlccs-a-535573/ 6 pp.

Kollmann, Robert , et al., "Fallstricke beim Einsatz von MLCCs", From Analog-Praxis.de https://www.analog-praxis.de/fallstricke-beim-einsatz-von-mlccs-a-535573/,6 pp.

(56) References Cited

OTHER PUBLICATIONS

Microchip Technology Inc, "[Uploaded in 2 parts] Microchip Technology Inc. microIDTM 125 KHz RFID System Design Guide, 1998", Microchip Technology Inc. microIDTM 125 kHz RFID System Design Guide, 1998, 161 pp., 1998, pp. 1-67.

NEC Corporation, "Junction Field Effect Transistor 2SK3230", N-Channel Silicon Junction Field Effect Transistor for Impedance Converter of ECM, pp. 1-8, 2002.

Salzburger, Lukas, "[Uploaded in 4 parts] Mythen der Elektronikentwicklung", Mythen der Elektronikentwicklung, 117 pp., pp. 1-40.

Solutions Cubed, "Protecting Inputs in Digital Electronics", https://www.digikey.com/en/articles/techzone/2012/apr/protecting-inputs-in-digital-electronics, Contributed By Digi-Key Electronics, Apr. 11, 2012, 10 pp.

Trigona, "Haus und Wohnung: Telefon-Mithörverstärker", http://www.trigonal.de/sel/huw_09.htm,(No. English version available), Jul. 13, 2008, 2 pp.

Verma, S., et al., ""AudioDAQ", Embedded Network Sensor Systems", ACM, 2 Penn Plaza, Suite 701, New York, NY 10121-0701 USA, 6, Nov. 2012 (Nov. 6, 2012), Seiten 197-210, XP058029972, DOI: 10.1145/2426656.2426677 ISBN: 978-1-4503-1169-4.

Wikipedia , "[Uploaded in 3 parts] Coil (electrical engineering), English translation of Spule (Elektrotechnik)", 10.06.2020, Wikipedia (online), in https://de.wikipedia.org/w/index.php?title=Spule_(Elektrotechnik)&oldid=200834434The link in the citation is not available. An older version of the reference is attached from Wikipedia at: https://de.wikipedia.org/wiki/index,php?title=Spule_(Elektrotechnik)&oldid=200834434, 16 pp, 2020, pp. 1-5.

Wikipedia , "[Uploaded in 3 parts] Spule (Elektrotechnik), Spule (Elektrotechnik)", 10.06.2020, Wikipedia (online), in https://de.wikipedia.org/w/index.php?title=Spule_(Elektrotechnik)&oldid=200834434, with English translationThe link in the citation is not available. An older version of the reference is attached from Wikipedia at: https://de.wikipedia.org/wiki/index,php?title=Spule_(Elektrotechnik)&oldid=200834434, 16 pp, 2020, pp. 1-5.

Wikipedia, "[Uploaded in 5 parts] Lautsprecher", From Wikipedia: https://de.wikipedia.org/wiki/Lautsprecher, 28 pp.

Wikipedia, "[Uploaded in 5 parts] Loudspeaker", English Translation from German Wikipedia version: https://de.wikipedia.org/wiki/Lautsprecher, 27 pp.Please note that the English version does not correspond exactly to the German Wikipedia entry.

Wikipedia, "Kapazitatsdiode", From Wikipedia (German): https://de.wikipedia.org/wiki/Kapazit%C3%A4tsdiode,, Feb. 24, 2021, 3 pp.

Wikipedia, "Normalized Power Spectral Density", (G)MSK-Spektrum, https://en.wikipedia.org/wiki/Minimum-shift_keying#/media/File:GMSK_PSD.png, zuletzt geöffnet: Apr. 15, 2019,, Feb. 7, 2019, 2 pp.

Wikipedia, "Optimalfilter", From Wikipedia: https://de.wikipedia.org/wiki/Optimalfilter with English translation,, Mar. 7, 2021, pp. 1-4.

Wikipedia, "Pulsdauermodulation", Pulsdauermodulation, https://de.wikipedia.org/wiki/Pulsdauermodulationm,, Jul. 31, 2021, pp. 1-6.

Wikipedia, "Pulse Duration Modulation", English Translation of Pulsdauermodulation, https://de.wikipedia.org/wiki/Pulsdauermodulation with English translation,, Jul. 31, 2021, pp. 1-6.

Wikipedia, "UART (Universal Asynchronous Receiver Transmitter)", English Translation of UART-Kommunikation, https://de.wikipedia.org/wiki/Universal_Asynchronous_Receiver_Transmitter,, Dec. 13, 2020, pp. 1-4.

Wikipedia, "UART (Universal Asynchronous Receiver Transmitter)", UART-Kommunikation, https://de.wikipedia.org/wiki/Universal_Asynchronous_Receiver_Transmitter,, Dec. 13, 2020, pp. 1-5.

Wikipedia, "Varactor diode", English translation from Wikipedia: https://de.wikipedia.org/wiki/Kapazit%C3%A4tsdiode,, Feb. 24, 2021, 3 pp.

IEEE SA, "IEEE Standard for Low-Rate Wireless Networks", IEEE 802.15.4.w—2020; 46 pp.Amendment 2: Low Power Wide Area Network (LPWAN) Extension to the Low-Energy Critical Infrastructure Monitoring (LECIM) Physical Layer (PHY), 2020, pp. 1-46.

"Premo, RFID Transponder Inductors", 32 pages.

Verma, S., et al., ""AudioDAQ", Embedded Network Sensor Systems", ACM, 2 Penn Plaza, Suite 701, New York, NY 10121-0701 USA, Nov. 6, 2012 (Nov. 6, 2012), Seiten 197-210, XP058029972, DOI: 10.1145/2426656.2426677 ISBN: 978-1-4503-1169-4.

* cited by examiner

BIDIRECTIONAL CONFIGURATION OF SENSOR NODES WITH MOBILE PHONE WITH NO EXTENSION

CROSS-REFERENCE TO RELATED APPLICATIONS

This application is a continuation of copending International Application No. PCT/EP2020/052105, filed Jan. 29, 2020, which is incorporated herein by reference in its entirety, and additionally claims priority from German Application No. 10 2019 201 152.7, filed Jan. 30, 2019, which is also incorporated herein by reference in its entirety.

BACKGROUND OF THE INVENTION

Embodiments of the present invention relate to a method for transmitting data between a user terminal and another apparatus. Further embodiments relate to a user terminal, another apparatus and a system comprising a user terminal and another apparatus. Some embodiments relate to a bidirectional configuration of sensor nodes with a mobile phone with no extension.

Conventionally, user-configurable apparatuses, like IoT nodes (like sensor nodes) or WLAN cameras, for example, are configured via a wired connection. However, several electrical contacts are used here both at the apparatus to be configured and the user terminal, like a mobile phone, used for configuring the apparatus.

Alternatively, user-configurable apparatuses can be configured via a radio connection. However, dedicated transmission/reception elements are used here.

Furthermore, user-configurable apparatuses can be configured via an optical connection. However, both visual contact and dedicated optical components are used here.

Additionally, user-configurable apparatuses can be configured via an acoustic connection, as is, for example, done in smoke detectors. However, using an acoustic connection entails a microphone in the apparatus.

Furthermore, user-configurable apparatuses can be configured by means of magnetic coupling. Usually, NFC (Near-Field Communication) is used here, wherein additional NFC elements are used in the apparatus. To aggravate the situation, not all user terminals support NFC. Currently available iPhones®, for example, only support reading, but not writing using NFC.

Additionally, making use of the magnetic effect of loudspeakers has been known. U.S. Pat. No. 2,381,097A, for example, describes a so-called telephone listening amplifier which make use of the magnet effect of loudspeakers. The magnetic field of a loudspeaker here is received, amplified and converted to an acoustic signal by another loudspeaker.

U.S. Pat. No. 4,415,769A describes an apparatus allowing transmitting and receiving signals via a telephone line to at least one inductive element of the telephone apparatus by means of electromagnetic coupling.

U.S. Pat. No. 3,764,746A describes a data coupler for coupling a data terminal to a telephone network with no direct conducting connection. Data signals from an induction coil here are electromagnetically coupled into a loudspeaker of a telephone receiver.

The object underlying the present invention is providing a concept which allows a cheap configuration of an apparatus, easy to be performed by a user.

SUMMARY

According to an embodiment, a method for transmitting data between a user terminal and another apparatus may have the steps of: generating a signal for driving an electromagnetic functional unit, the electromagnetic functional unit being an actuator of a loudspeaker of the user terminal or the electromagnetic functional unit being an electromagnetic oscillating circuit connected to the user terminal, driving the electromagnetic functional unit by the generated signal to produce, by the electromagnetic functional unit, a magnetic signal which carries first data to be transmitted from the user terminal to the other apparatus, detecting another signal output by the other apparatus, the other signal carrying second data to be transmitted from the other apparatus to the user terminal, wherein the magnetic signal and the other signal differ in the physical signal type; wherein the first data are configuration data for configuring the other apparatus, the method further having a step of detecting the magnetic signal by an electromagnetic oscillating circuit of the other apparatus to receive the first data, the method further having a step of configuring the other apparatus based on the received first data.

According to another embodiment, another apparatus may have: a microcontroller, an electromagnetic oscillating circuit for detecting a magnetic signal, output means for outputting another signal, wherein the microcontroller is configured to evaluate the magnetic signal detected by the electromagnetic oscillating circuit to receive first data, which the magnetic signal carries, to be transmitted from a user terminal to the other apparatus, wherein the microcontroller is configured to output the other signal by means of the output means, the other signal carrying second data to be transmitted from the other apparatus to the user terminal, wherein the magnetic signal and the other signal differ in the physical signal type, wherein the first data are configuration data for configuring the other apparatus, wherein the microcontroller is configured to configure the other apparatus based on the configuration data, wherein the microcontroller is configured to integrate the other apparatus into a wireless network based on the configuration data.

According to still another embodiment, another apparatus may have: a microcontroller, an electromagnetic oscillating circuit for detecting a magnetic signal, output means for outputting another signal, wherein the microcontroller is configured to evaluate the magnetic signal detected by the electromagnetic oscillating circuit to receive first data, which the magnetic signal carries, to be transmitted from a user terminal to the other apparatus, wherein the microcontroller is configured to output the other signal by means of the output means, the other signal carrying second data to be transmitted from the other apparatus to the user terminal, wherein the magnetic signal and the other signal differ in the physical signal type, wherein the first data are configuration data for configuring the other apparatus, wherein the microcontroller is configured to configure the other apparatus based on the configuration data, wherein the other signal is an acoustic signal, wherein the output means is an acoustic signal generator, wherein the acoustic signal generator is a piezo disk.

The present invention is based on the idea of using an electromagnetic actuator of a loudspeaker of the user terminal or an electromagnetic oscillating (or resonant) circuit connected to the user terminal via a (wired or wireless, for example) audio interface of the user terminal to generate a magnetic field which carries the data (like configuration data for configuring the other apparatus, for example) to be transmitted to the other apparatus (like an IoT node or a WLAN camera, for example), whereas data to be transmitted from the other apparatus to the user terminal are transmitted based on another signal, like an optical signal, acoustic signal or radio signal, for example, which can be detected by a camera, microphone or radio module of the user terminal, for example.

The advantage is that any conventional user terminal, like a mobile phone or tablet computer, can be used for this.

A cheap electromagnetic oscillating circuit which can, for example, be realized by means of an LC resonant circuit, can be used in the other apparatus for detecting the magnetic field which carries the data. Cheap output means, like a LED or display, for generating an optical signal, an acoustic signal generator, like a piezo disk, for generating an acoustic signal or a radio module for generating a radio signal can be used in the other apparatus for generating the other signal.

Embodiments thus provide bidirectional configuring means with a standard mobile phone with no extension or modification.

Embodiments provide a method for [for example bidirectionally] transmitting data between a user terminal and another apparatus. The method comprises a step of generating a signal for driving an electromagnetic functional unit, the electromagnetic functional unit being an actuator of a loudspeaker of the user terminal or the electromagnetic functional unit being an electromagnetic oscillating circuit connected to the user terminal. Additionally, the method comprises a step of driving the electromagnetic functional unit by the generated signal to produce, by the electromagnetic functional unit, a magnetic signal [for example magnetic field] which carries first data to be transmitted from the user terminal to the other apparatus. Additionally, the method comprises a step of detecting [for example sensing] [for example by the user terminal] another signal output by the other apparatus, the other signal carrying second data to be transmitted from the other apparatus to the user terminal [for example to receive the second data], wherein the magnetic signal and the other signal differ in the physical signal type.

In embodiments, the other signal can be output by the other apparatus responsive to the magnetic signal [for example responsive to receiving the magnetic signal or the first data which the magnetic signal carries].

In embodiments, the other signal can be an optical signal, acoustic signal or electromagnetic signal [for example radio signal].

In embodiments, the other signal can be detected [for example sensed] by the user terminal [for example by means of a camera, microphone, or radio interface] or by an apparatus connected to the user terminal [for example by a base station in the case of a radio signal, or a headset or wireless audio adapter in the case of an acoustic signal].

In embodiments, the other signal can be an optical signal, wherein the optical signal can be detected [for example sensed] by means of a camera of the user terminal to receive the second data which the optical signal carries.

In embodiments, the optical signal can be output by means of a light-emitting diode, display or screen of the other apparatus.

In embodiments, the optical signal can be a two-dimensional optoelectronically readable text [for example a 2D barcode or QR code] which is output on the display of the other apparatus.

In embodiments, the other signal can be an acoustic signal, wherein the acoustic signal can be detected [for example sensed] by means of a microphone of the user terminal or a microphone connected to the user terminal [for example, headset or Bluetooth headset] to receive the second data which the acoustic signal carries.

In embodiments, the acoustic signal can be output by means of an acoustic signal generator of the other apparatus.

In embodiments, the acoustic signal generator can be a loudspeaker, buzzer, beeper or piezo disk.

In embodiments, the other signal can be an electromagnetic signal [for example a radio signal], wherein the electromagnetic signal can be detected [for example sensed] by means of a radio interface of the user terminal or a radio interface of a base station connected to the user terminal to receive the second data which the electromagnetic signal carries.

Exemplarily, the electromagnetic signal can be a Bluetooth signal, WLAN signal, mobile radio signal [for example GSM, UMTS, LTE], RFID signal or UniDir-MIOTY signal.

Exemplarily, the received second data can be transmitted from the base station to the user terminal.

In embodiments, the radio interface can be a Bluetooth interface, WLAN interface, mobile radio interface, RFID interface or UniDir-MIOTY interface.

In embodiments, the method can further comprise a step of outputting the other signal by the other apparatus.

In embodiments, the generated signal can be in a frequency range between 10 Hz and 22 KHz.

In embodiments, the generated signal can be in the ultrasonic frequency range or above. In embodiments, the data can be modulated onto the generated signal (128).

In embodiments, a ratio between carrier frequency and modulation bandwidth of the generated signal can be smaller than 25%.

In embodiments, the first data can be configuration data for configuring the other apparatus.

In embodiments, the generated signal can be generated by an audio signal generator of the user terminal.

In embodiments, the generated signal can be generated by an audio signal generator connected to the user terminal.

In embodiments, the electromagnetic functional unit can be an electromagnetic oscillating circuit connected to the user terminal, wherein the electromagnetic oscillating circuit can be connected to the user terminal via an audio interface of the user terminal, or wherein the electromagnetic oscillating circuit can be connected via an audio interface of a wireless audio adapter connected to the user terminal.

Exemplarily, the audio interface can be a wired audio interface, like a phone jack, USB-C audio port or lightning audio port.

Exemplarily, the wireless audio adapter can be a Bluetooth, WLAN or certified wireless USB audio adapter.

In embodiments, the electromagnetic oscillating circuit can be an LC resonant circuit.

In embodiments, the user terminal can be a mobile phone or tablet computer.

In embodiments, the method can further comprise a step of detecting the magnetic signal [for example magnetic field] by an electromagnetic oscillating circuit of the other apparatus to receive the first data.

Exemplarily, the method can further comprise a step of bring closer to each other the user terminal and the other apparatus before producing the magnetic signal which carries the first data.

In embodiments, the method can further comprise a step of configuring the other apparatus based on the received first data.

In embodiments, configuring the other apparatus can comprise connecting the other apparatus to a communication network using the received first data.

In embodiments, the steps of detecting and configuring can be performed by the other apparatus.

In embodiments, the other apparatus can be an IoT node or WLAN camera.

In embodiments, the IoT node can be a sensor node or actuator node.

In embodiments, the method can further comprise a step of providing a graphical user interface on the user terminal, wherein the magnetic signal can be generated responsive to a user input on the graphical user interface.

In embodiments, the first data which the magnetic field carries can be based on stored data and/or be based on data input by the user on the graphical user interface.

In embodiments, the magnetic signal can be generated responsive to an input [for example pressing a button] at a base station which the other apparatus is to be connected to.

In embodiments, the method can further comprise a step of retrieving an audio file, wherein the magnetic signal can be generated based on the audio file.

Exemplarily, the audio file can be reproduced on the user terminal to generate the signal for driving the electrical functional unit.

In embodiments, the method can further comprise a step of transmitting an audio signal via a telephone link, wherein the signal for driving the electromagnetic functional unit can be generated based on the audio signal transmitted via the telephone link [the generated signal can, for example, be an amplified [for example analog] version of the [for example digital] audio signal].

Exemplarily, a telephone link can be used, an audio signal being transferred via the telephone link, the audio signal producing the magnetic signal when reproduced by the telephone apparatus.

In embodiments, the method can comprise voice communication with a person or voice-controlled system, wherein the audio signal can be produced based on information from the voice communication.

In embodiments, the other apparatus can switch from an operating mode of reduced current consumption to a normal operating mode responsive to detecting the magnetic signal, wherein the method can further comprise a step of sending a further signal, the further signal carrying third data to be transmitted from the user terminal to the other apparatus, the magnetic signal and the further signal differing in the physical signal type.

Exemplarily, the other apparatus can comprise a microcontroller or an LC resonant circuit for detecting the magnetic signal, wherein the LC resonant circuit can be connected directly to an input or inputs of a comparator of the microcontroller. The microcontroller can switch from an operating mode of reduced current consumption to a normal operating mode responsive to an interrupt of the comparator to receive the further signal.

In embodiments, the further signal can be transmitted by means of a near-field transmission technology [for example NFC].

In embodiments, the third data can be configuration data for configuring the other apparatus.

In embodiments, the method can further comprise a step of configuring the other apparatus based on the received third data.

In embodiments, configuring the other apparatus can comprise connecting the other apparatus to a communication network using the received third data.

Further embodiments provide a user terminal, the user terminal being configured to drive a signal generator to generate a signal for driving an electromagnetic functional unit, and to drive the electromagnetic functional unit by the generated signal to produce, by the electromagnetic functional unit, a magnetic signal [for example magnetic field] which carries first data to be transmitted from the user terminal to another apparatus, the electromagnetic functional unit being an actuator of a loudspeaker of the user terminal or the electromagnetic functional unit being an electromagnetic oscillating circuit connected to the user terminal, the user terminal being configured to receive second data to be transmitted from another apparatus to the user terminal, the second data being output by the other apparatus by means of another signal, wherein the magnetic signal and the other signal differ in the physical signal type.

In embodiments, the other signal can be an optical signal, acoustic signal or electromagnetic signal [for example radio signal].

In embodiments, the other signal can be detected [for example sensed] by the user terminal [for example by means of a camera, microphone or radio interface] or by an apparatus connected to the user terminal [for example by a base station in the case of a radio signal, or a headset or wireless audio adapter in the case of an acoustic signal].

In embodiments, the other signal can be an optical signal, wherein the user terminal can be configured to detect [for example sense] the optical signal by means of a camera of the user terminal.

In embodiments, the other signal can be an acoustic signal, wherein the user terminal can be configured to detect [for example sense] the acoustic signal by means of a microphone of the user terminal or a microphone [for example headset or a Bluetooth headset] connected to the user terminal.

In embodiments, the other signal can be an electromagnetic signal [for example radio signal], wherein the user terminal can be configured to detect [for example sense] the electromagnetic signal by means of a radio interface of the user terminal or a radio interface of a base station connected to the user terminal.

Exemplarily, the electromagnetic signal can be a Bluetooth signal, WLAN signal, mobile radio signal [for example GSM, UMTS, LTE], RFID signal or UniDirMIOTY signal.

Further embodiments provide another apparatus, the other apparatus comprising a microcontroller, an electromagnetic oscillating circuit for detecting a magnetic signal [for example a magnetic field], and output means for outputting another signal, the microcontroller being configured to evaluate the magnetic signal detected by the electromagnetic oscillating circuit to receive first data, which the magnetic signal carries, to be transmitted from a user terminal to the other apparatus, the microcontroller being configured to output the other signal by means of the output means, the other signal carrying second data to be transmitted from the other apparatus to the user terminal, wherein the magnetic signal and the other signal differ in the physical signal type.

In embodiments, the other signal can be an optical signal, acoustic signal or electromagnetic signal [for example radio signal].

In embodiments, the other signal can be an optical signal, wherein the output means can be a light-emitted diode, display or screen.

In embodiments, the other signal can be an acoustic signal, wherein the output means can be an acoustic signal generator.

In embodiments, the acoustic signal generator can be a loudspeaker, buzzer, beeper or piezo disk.

In embodiments, the piezo disk can be connected directly to the microcontroller.

In embodiments, the piezo disk can be connected to the microcontroller via a coil. In embodiments, the piezo disk can be connected to the microcontroller via two antiparallel diodes.

In embodiments, the piezo disk can be connected to the microcontroller via a coil and, in series to the coil, via two antiparallel diodes.

In embodiments, the piezo disk can be operated to resonate and/or in the ultrasonic range.

In embodiments, the other signal can be an electromagnet signal [for example radio signal], wherein the output means can be a radio interface [for example Bluetooth interface, WLAN interface, mobile radio interface (for example GSM, UNTS or LTE), RFID interface or UniDir-MIOTY interface].

Further embodiments provide a system comprising a user terminal in accordance with any of the embodiments described herein and another apparatus in accordance with any of the embodiments described herein.

BRIEF DESCRIPTION OF THE DRAWINGS

Embodiments of the present invention will be described in greater detail referring to the appended drawings, in which.

DETAILED DESCRIPTION OF THE INVENTION

In the following description of the embodiments of the present invention, equal elements or elements of equal effect are provided with same/equal reference numerals in the figures so that the description thereof is mutually interchangeable.

Figure 1:
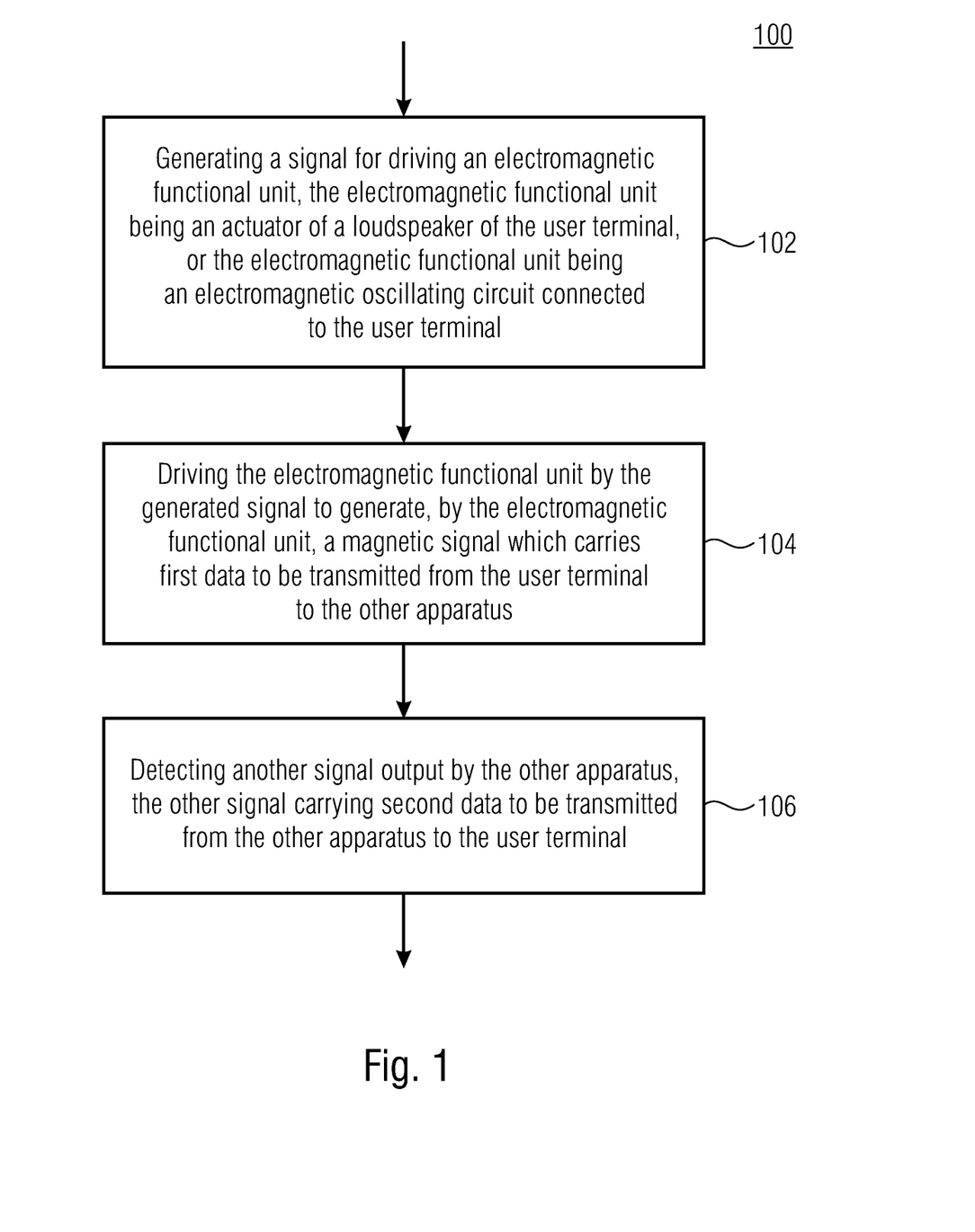
FIG. 1 shows a flowchart of a method for transmitting data between a user terminal and another apparatus, in accordance with an embodiment of the present invention.

FIG. 1 shows a flowchart of a method 100 for transmitting data between a user terminal and another apparatus.

The method 100 comprises a step 102 of generating a signal for driving an electromagnetic functional unit, the electromagnetic functional unit being an actuator of a loudspeaker of the user terminal or the electromagnetic functional unit being an electromagnetic oscillating circuit connected to the user terminal.

Additionally, the method 100 comprises a step 104 of driving the electromagnetic functional unit by the generated signal to produce, by the electromagnetic functional unit, a magnetic signal which carries first data to be transmitted from the user terminal to the other apparatus.

Furthermore, the method 100 comprises a step 106 of detecting (for example sensing) another signal output by the other apparatus, the other signal carrying second data to be transmitted from the other apparatus to the user terminal.

Thus, the magnetic signal and the other signal differ from each other with regard to the physical signal type.

In embodiments, the other signal can be an optical signal, acoustic signal or radio signal.

Thus, embodiments allow, using a conventional user terminal, i.e. with no hardware modification, transmitting a magnetic signal to the other apparatus on the one hand and receiving another signal from the other apparatus on the other hand, for example by means of a camera, microphone or radio module of the user terminal.

Embodiments of the method 100 for transmitting data between a user terminal and another apparatus, shown in FIG. 1, will be discussed below in greater detail referring to FIGS. 2, 3a and 3b.

Figure 2:
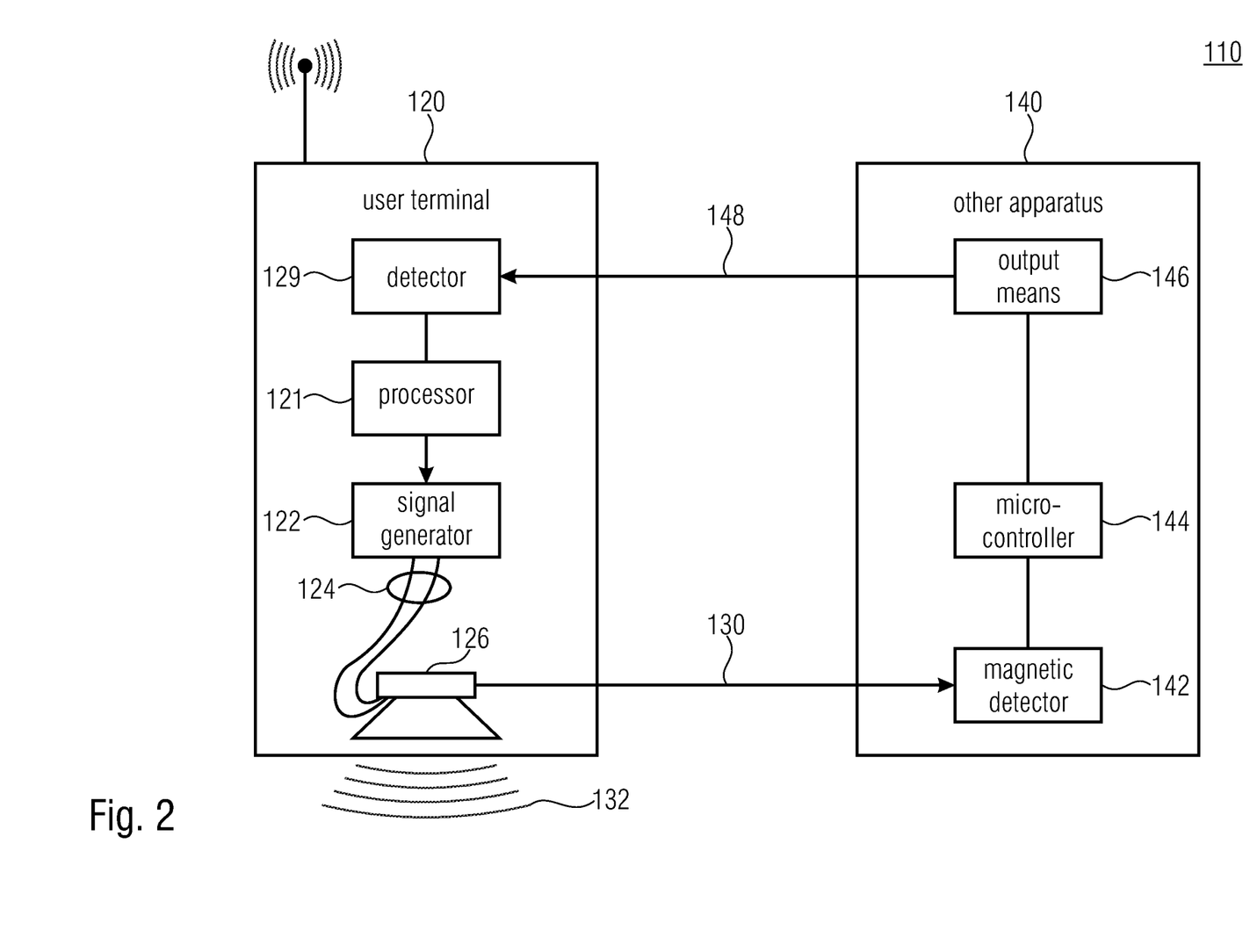
FIG. 2 shows a schematic block circuit diagram of a system comprising a user terminal and another apparatus, in accordance with an embodiment of the present invention.

FIG. 2 shows a schematic block circuit diagram of a system 110 comprising a user terminal 120 and another apparatus 140, in accordance with an embodiment of the present invention.

In embodiments, the user terminal 120 comprises a signal generator 122 (for example an audio signal generator, like an amplifier) and a loudspeaker 150 having an electromagnetic actuator 126 (for example a voice coil). The user terminal 120 (or a processor 121 of the user terminal 120, for example) is configured to drive the signal generator 122 to generate a signal 124 for driving the electromagnetic actuator 126, and to drive the electromagnetic actuator 126 by the generated signal 124 to generate, by the electromagnetic actuator 126, a magnetic signal (for example a magnetic field) 130 which carries the first data.

In embodiments, the generated signal 124 can be in the ultrasonic frequency range or above. The sound waves 132 also produced by driving the electromagnetic actuator 126 by the generated signal 124 are thus in a frequency range not or only poorly audible for humans or are not emitted or only emitted in an attenuated manner, due to the upper cut-off frequency of the loudspeaker 150.

Exemplarily, a frequency or frequency range of the generated signal 124 can be above 16 kHz, for example in the range between 16 kHz and 22 kHz.

In embodiments, the first data can be modulated onto the generated signal 124, for example by FSK (frequency shift keying), MSK (minimum shift keying), or GMSK (Gaussian minimum shift keying). Another type of modulation can of course also be used, like ASK (amplitude shift keying), PSK (phase shift keying) or OOK (on-off keying, a type of amplitude shift keying where the carrier is switched on and off), for example.

In embodiments, the ratio between carrier frequency and modulation bandwidth of the generated signal can be smaller than 25% (or exemplarily smaller than 20% or smaller than 15%).

In embodiments, the user terminal 120 can be a mobile phone (smartphone) or tablet computer.

In embodiments, the other apparatus 140 can comprise a magnetic detector 142 configured to detect the magnetic signal (for example magnetic field) 130 which carries the first data to be transmitted from the user terminal to the other apparatus 140.

In embodiments, the other apparatus 140 can further comprise a microcontroller 144 configured to evaluate the detected magnetic signal (for example magnetic field) 130 to receive the first data.

In embodiments, the other apparatus 140 can comprise output means 146 configured to output another signal 148. The microcontroller 144 can thus be configured to output the other signal 148 by means of the output means 146, the other signal 148 carrying second data to be transmitted from the other apparatus 140 to the user terminal 120.

In accordance with embodiments, the magnetic signal 130 and the other signal 148 differ in the physical signal type. Thus, the other signal 148 can, for example, be an optical signal, acoustic signal or electromagnetic signal (for example radio signal).

Exemplarily, the output means 146 can be optical output means, like a light-emitting diode, display or screen, configured to output an optical signal. Alternatively, the output means 146 can be acoustic output means, like a loudspeaker, buzzer, beeper or piezo disk, for example. Alternatively, the output means 146 can be a radio interface, like Bluetooth interface, WLAN (wireless local area network) interface, mobile radio interface (like GSM (global system mobile), UMTS (universal mobile telecommunication system), LTE (long term evolution)), an RFID (radio frequency identification) interface or UniDir-MIOTY interface.

In embodiments, the user terminal 120 can comprise a detector 129 configured to detect the other signal 148. Alternatively, the user terminal 120 can also be connected to an (external) detector configured to detect the other signal 148.

Exemplarily, the other signal 148 can be an acoustic signal. In this case, the detector 129 can be a microphone configured to detect the acoustic signal 148. Here, a microphone of the user terminal 120 can be used, or a microphone, for example headset or Bluetooth headset, connected to the user terminal 120 (for example via a wired or wireless audio interface. Alternatively, the other signal 148 can be an optical signal. In this case, the detector 129 can be a camera configured to detect the optical signal. Alternatively, the other signal 148 can be a radio signal. In this case, the detector can be a radio interface (for example radio module) of the user terminal or base station connected to the user terminal. The radio interface can be a Bluetooth interface, WLAN interface, mobile radio interface, RFID interface or UniDir-MIOTY interface, for example.

In embodiments, the user terminal 120 can be a mobile phone (smartphone) or tablet computer.

In embodiments, the first data which the magnetic field 130 carries can be configuration data. The micro controller 144 can be configured to configure the other apparatus 140 based on the configuration data, for example to integrate the same in a wireless network.

Exemplarily, the other apparatus 140 can be a user-configurable apparatus, for example an IoT (Internet of things) node (for example a sensor node or actuator node) or a WLAN camera. In this case, the configuration data can comprise information for integrating the user-configurable apparatus 140 in a wireless network (for example sensor network or WLAN), like a network name and network key, for example. Other parameters, like a frequency channel to be used, time slots to be used or a hopping pattern to be used, can of course also be associated by the configuration data to the user-configurable apparatus 140.

Embodiments of the present invention thus provide a cheap and readily available method of configuring other apparatuses 140, like IoT nodes (for example sensor nodes).

Mobile phones are nowadays generally widespread as user terminals 120. Loudspeakers 150 are installed in the mobile phones. These are (almost) exclusively so-called electromagnetic loudspeakers.

The user terminal 120 (for example mobile phone) includes a signal generator 122 having an amplifier connected to the voice coil 126 of the loudspeaker 150 via two ports. In order to output an audio signal, the audio signal is passed to the amplifier which passes the signal 124 on to the voice coil 126 in an amplified manner. This deflects the diaphragm of the loudspeaker 150, the result being an acoustic signal 132. Apart from the acoustic signal, however, a magnetic field 130 the temporal course of which is determined by the audio signal, is also formed due to the principle involved.

Other apparatuses 140, like sensor nodes, can be configured cheaply and in an energy-efficient manner by receiving this magnetic field 130 by a magnetic detector 142, for example a simple oscillating circuit (for example only one coil and one capacitor).

Figure 3A:
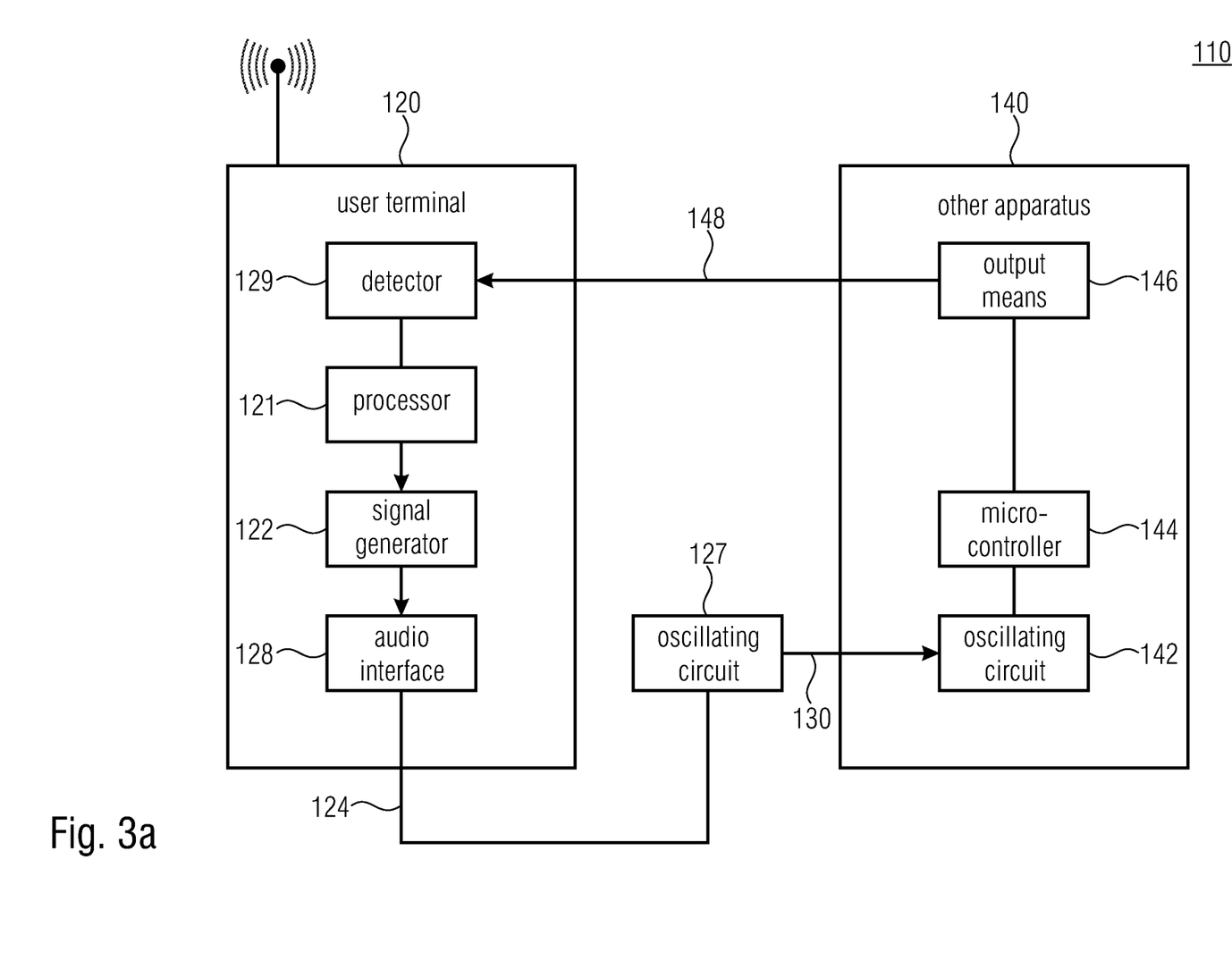
FIG. 3a shows a schematic block circuit diagram of a system comprising a user terminal and another apparatus, in accordance with another embodiment of the present invention.
Figure 3B:
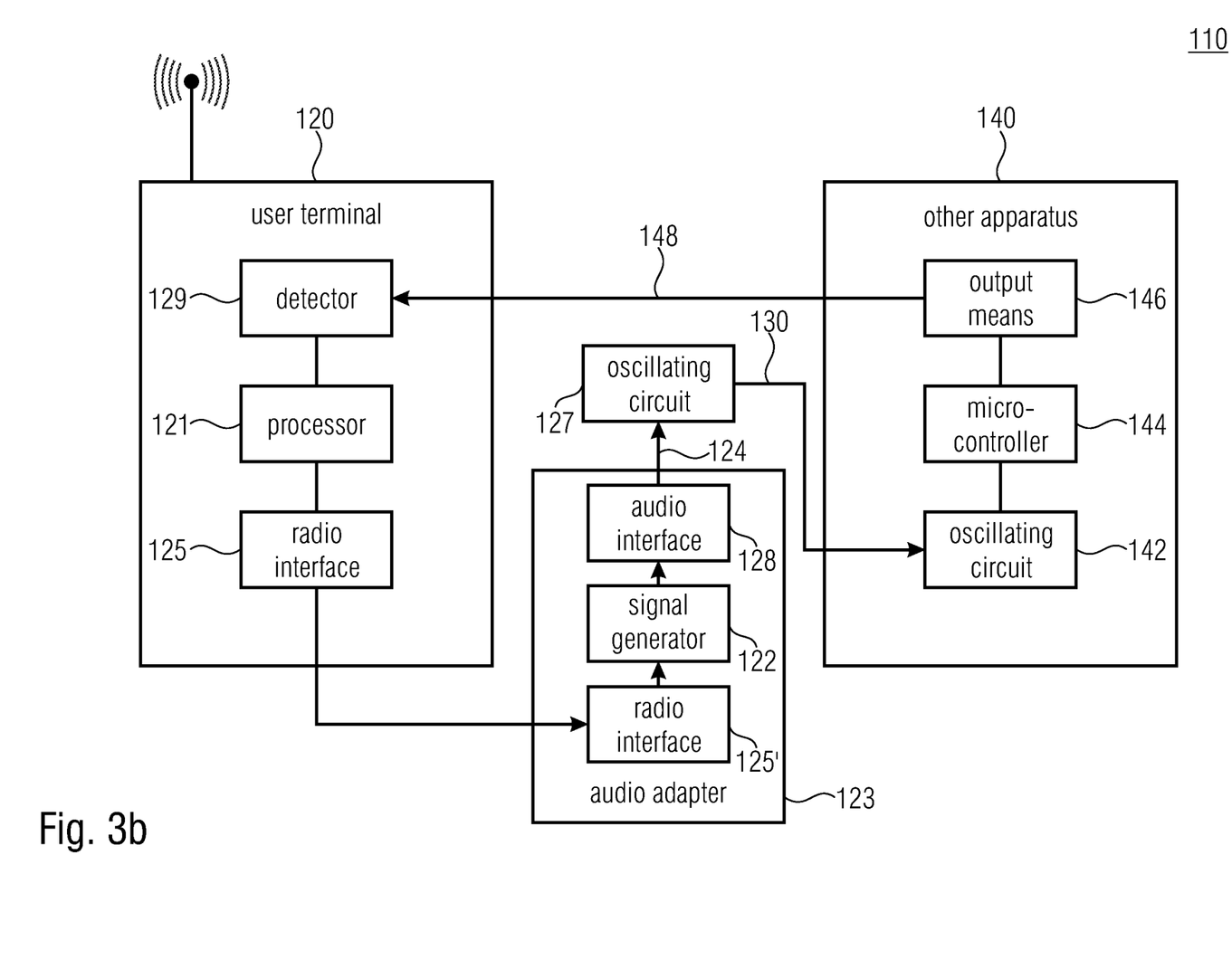
FIG. 3b shows a schematic block circuit diagram of a system comprising a user terminal and another apparatus, in accordance with another embodiment of the present invention.

FIG. 3a shows a schematic block circuit diagram of a system 110 comprising a user terminal 120 and another apparatus 140, in accordance with another embodiment of the present invention.

The user terminal 120 comprises a signal generator 122, the user terminal 120 (or a processor 121 of the user terminal 120, for example) being configured to drive the signal generator 122 to generate a signal 124 for driving an electromagnetic oscillating circuit 127, and to drive the electromagnetic oscillating circuit 127 by the generated signal 124 to produce, by the electromagnetic oscillating circuit 127, a magnetic signal (like a magnetic field) 130 which carries first data to be transmitted from the user terminal 120 to the other apparatus 140.

In embodiments, the signal generator 122 can be an audio signal generator. Conventionally, such an audio signal generator 122 is configured to generate an audio signal for driving an audio reproduction apparatus (like headsets) connected to the user terminal 120, wherein, in embodiments, instead of an audio reproduction apparatus, the electromagnetic oscillating circuit 127 is driven by the signal 124 generated by the audio signal generator 122 to generate the magnetic signal 130 which carries the first data. The audio signal generator 122 can, for example, be an amplifier.

In embodiments, the electromagnetic oscillating circuit 127 can be connected to the signal generator 122 via an audio interface 128. The audio interface 128 can, for example, be a wired audio interface, like a jack, an USB-C® audio port or Lightning® audio port.

In the embodiment shown in FIG. 3a, the user terminal 120 comprises the signal generator 122. Alternatively, the signal generator 122 can also be implemented externally of the user terminal 120. Exemplarily, the signal generator 122 can be implemented in a wireless audio adapter connected to the user terminal 120, as is shown in FIG. 3a.

In detail, FIG. 3a shows a schematic block circuit diagram of a system 100 comprising a user terminal 120 and another apparatus 140, wherein the user terminal 120 is connected to a wireless audio adapter 123 which comprises the signal generator 122, wirelessly (like via corresponding radio interfaces 125, 125' (like Bluetooth, WLAN, Certified Wireless USB)).

As can be recognized from FIG. 3a, in this case, the electromagnetic oscillating circuit 127 can be connected the signal generator 122 via an audio interface 128 of the wireless audio adapter 123. The audio interface 128 can be a wired audio interface, like a jack, an USB-C® audio port or a Lightning® audio port, for example.

The wireless audio adapter 123 can, for example, be a Bluetooth, WLAN or Certified Wireless USB audio adapter.

Further embodiments of the present invention will be described below, which can be applied both to embodiments in which the user terminal 120 comprises a signal generator 122, and to embodiments in which a wireless audio adapter 123 connected to the user terminal comprises the signal generator 122.

In embodiments, the generated signal can be in a frequency range between 10 Hz and 22 kHz.

In embodiments, the data can be modulated onto the generated signal 124, for example by means of FSK (frequency shift keying), MSK (minimum shift keying) or GMSK (Gaussian minimum shift keying). Another type of modulation can of course also be used, like ASK (amplitude shift keying), PSK (phase shift keying) or OOK (on-off keying, a type of amplitude shift keying where the carrier is switched on and off).

In embodiments, the ratio between carrier frequency and modulation bandwidth of the generated signal can be smaller than 25% (or exemplarily smaller than 20% or smaller than 15%).

In embodiments, the electromagnetic oscillating circuit can be an LC resonant circuit.

In embodiments, the user terminal 120 can be a mobile phone (smartphone) or tablet computer.

In embodiments, the other apparatus 140 can comprise a magnetic detector 142 configured to detect the magnetic signal (for example magnetic field) 130 which carries the first data to be transmitted from the user terminal to the other apparatus 140.

In embodiments, the other apparatus 140 can additionally comprise a microcontroller 144 configured to evaluate the detected magnetic signal (for example magnetic field) 130 to receive the first data.

In embodiments, the other apparatus 140 can comprise output means 146 configured to output another signal 148. The microcontroller 144 here can be configured to output the other signal 148 by means of the output means 146, the other signal 148 carrying second data to be transmitted from the other apparatus 140 to the user terminal 120.

In accordance with embodiments, the magnetic signal 130 and the other signal 148 differ in the physical signal type. Thus, the other signal 148 can, for example, be an optical signal, acoustic signal, or electromagnetic signal (for example radio signal).

Exemplarily, the output means 146 can be optical output means, like a light-emitting diode, display or screen, configured to output an optical signal. Alternatively, the output means 146 can be acoustic output means, like a loudspeaker, buzzer, beeper or piezo disk, for example. Alternatively, the output means 146 can be a radio interface, like a Bluetooth interface, WLAN (wireless local area network) interface, mobile radio interface (like GSM (global system mobile), UMTS (universal mobile telecommunication system), LTE (long term evolution)), an RFID (radio frequency identification) interface or UniDir-MIOTY interface.

In embodiments, the user terminal 120 can comprise a detector 129 configured to detect the other signal 148. Alternatively, the user terminal 120 can also be connected to an (external) detector configured to detect the other signal 148.

Exemplarily, the other signal 148 can be an acoustic signal. In this case, the detector 129 can be a microphone configured to detect the acoustic signal 148. Here, a microphone of the user terminal 120 can be used, or a microphone, for example headset or Bluetooth headset, connected to the user terminal 120 (for example via a wired or wireless audio interface. Alternatively, the other signal 148 can be an optical signal. In this case, the detector 129 can be a camera configured to detect the optical signal. Alternatively, the other signal 148 can be a radio signal. In this case, the detector can be a radio interface (for example radio module) of the user terminal or base station connected to the user terminal. The radio interface can be a Bluetooth interface, WLAN interface, mobile radio interface, RFID interface or UniDir-MIOTY interface, for example.

In embodiments, the user terminal 120 can be a mobile phone (smartphone) or tablet computer.

In embodiments, the first data which the magnetic field 130 carries can be configuration data. The micro controller 144 can be configured to configure the other apparatus 140 based on the configuration data, for example to integrate the same in a wireless network.

Exemplarily, the other apparatus 140 can be a user-configurable apparatus, for example an IoT (Internet of things) node (for example a sensor node or actuator node) or a WLAN camera. In this case, the configuration data can comprise information for integrating the user-configurable apparatus 140 in a wireless network (for example sensor network or WLAN), like a network name and network key, for example. Other parameters, like a frequency channel to be used, time slots to be used or a hopping pattern to be used, can of course also be associated by the configuration data to the user-configurable apparatus 140.

Embodiments of the present invention thus provide a cheap and readily available method of configuring other apparatuses 140, like IoT nodes (for example sensor nodes).

Mobile phones are nowadays generally widespread as user terminals 120. Loudspeakers 150 are installed in the mobile phones. These are (almost) exclusively so-called electromagnetic loudspeakers.

The user terminal 120 (for example mobile phone) includes a signal generator 122 having an amplifier connected to the voice coil 126 of the loudspeaker 150 via two ports. In order to output an audio signal, the audio signal is passed to the amplifier which passes the signal 124 on to the voice coil 126 in an amplified manner. This deflects the diaphragm of the loudspeaker 150, the result being an acoustic signal 132. Apart from the acoustic signal, however, a magnetic field 130 the temporal course of which is determined by the audio signal, is also formed due to the principle involved.

Detailed embodiments of the present invention will be described below.

1. USING DIFFERENT COMMUNICATION CHANNELS FOR CONFIGURATION/STATUS QUERIES TO SENSOR NODE AND CONFIRMATIONS/STATUS INFORMATION (FEEDBACK) FROM SENSOR NODE

In embodiments, the configuration/status query as described above can be performed via a magnetic signal (for example magnetic field) 130 or also via a microphone and the other apparatus (for example sensor node) 140. The communication from the other apparatus 140 to the user terminal (for example mobile phone) 120 can be performed as described below.

1.1. Feedback from Senor Node by Flashing Signals

In embodiments, an LED (light-emitting diode) as output means 146 can be installed in the other apparatus (for example sensor node) 140, for example. The optical signal 148 of the LED 146 can be evaluated by a user (for example a person) or a camera of the user terminal (for example mobile phone) 120 to recognize a successful configuration, for example. In the case of an evaluation by a camera 129 of the user terminal 120, apparatus information can be fed back in order to allow configurations adjusted thereto.

This means that a normal mobile phone is sufficient for bidirectional communication.

1.2. Feedback from Sensor Node Via Display on the Sensor Node

In embodiments, the other apparatus (for example sensor node) 140 can comprise an (OLED, LCD, eInk, etc.) display as output means 146, in which a QR code can be displayed, which is recorded by the camera 129 of the user terminal (for example mobile phone) 120 and can then be evaluated.

This means that a normal mobile phone is sufficient for bidirectional communication.

1.3. Feedback from Sensor Node Via Unidirectional Radio Link

In embodiments, the feedback from the other apparatus 140 to the user terminal 120 can, for example, be via a unidirectional radio link, like UniDir-MIOTY, for example. The feedback can then be received already via a base station which during normal operation of the other apparatus (for example sensor node) 140 also serves as a receiver, and passed on to the user or his/her user terminal (for example mobile phone) 120 (for example via a web interface, LED, display or acoustic signal, etc.).

This means that a normal mobile phone is sufficient for bidirectional communication.

1.4. Feedback from Sensor Node by a Loudspeaker/Buzzer/Beeper

In embodiments, a loudspeaker as output means 146 can be installed in the other apparatus (for example sensor node) 140, wherein in this case feedback from the other apparatus (for example sensor node) 140 to the user terminal (for example mobile phone) 120 or a (Bluetooth) headset connected to the user terminal can be performed directly via a microphone.

This means that a normal mobile phone is sufficient for bidirectional communication.

Alternatively or additionally, an acoustic signal can be directed directly to the user (for example a person present). The acoustic signal can, for example, be an acknowledging tone, like beeping once for successful transmission or configuration and beeping twice for a faulty transmission or configuration, or a voice message, for example.

1.5. A Piezo Disk can be Installed in the Sensor Node as an Acoustic Signal Generator In embodiments, a cheap piezo disk (see FIG. 4) can be used as an acoustic signal generator 146 in the other apparatus (for example sensor node) 140. An advantage of the piezo disk is that it is cheap. Another advantage of the piezo disk is that no opening is required in the casing of the other apparatus (for example sensor node) 140 to guide the sound of the piezo disk to the environment.

However, piezo disks are relatively unsuitable as loudspeakers since they can only be operated to resonate efficiently in a small frequency range.

In embodiments, the piezo disk can be operated to resonate, in a small band in the ultrasonic range to produce an acoustic signal 148.

Figure 4:
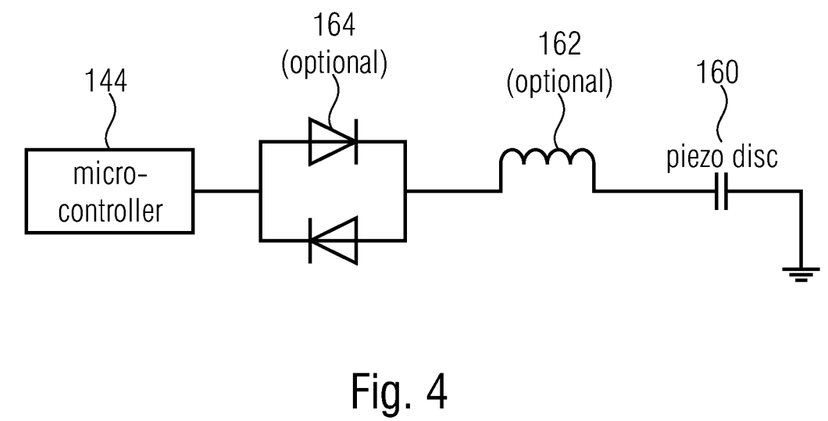
FIG. 4 shows a schematic block circuit diagram of coupling a piezo disk to a microcontroller of the other apparatus, in accordance with an embodiment of the present invention.

FIG. 4 shows a schematic block circuit diagram of coupling a piezo disk 160 to a microcontroller 144 of the other apparatus 140, in accordance with an embodiment of the present invention.

As can be recognized in FIG. 4, in embodiments, the piezo disk 160 can be connected to the microcontroller 144, for example via a coil 162 and two antiparallel diodes 164. The piezo disk 160 can also be connected to the microcontroller 144 via only the coil 162 or the two antiparallel diodes 164. Of course, the piezo disk can also be connected directly (i.e. no coil 162 or diodes 164) to the microcontroller 144.

In embodiments, the piezo disks can be connected to the microcontroller 144 directly via a coil. The coil, together with the capacity of the piezo disk, forms a series oscillating circuit. Thus, the volume of the piezo disk can be increased.

In embodiments, the piezo disk can be glued to the casing of the other apparatus 140. This means that no opening is required in the casing of the other apparatus (sensor node casing). The acoustic signal (sound) 148 is produced by the piezo disk and transmitted to the environment through the casing of the other apparatus 140.

In embodiments, the piezo disk can be connected to the microcontroller 144 (via a coil or without a coil) via two antiparallel diodes (see FIG. 4). This means that the threshold voltage of the diodes prevents, from a circuit-technological point of view, that small signals from the piezo disk can be received in the microcontroller 144 (in analogy this can also be realized for a loudspeaker, instead of the piezo disk). This prevents potential interception where the piezo disk functions as a microphone and receives surround sound, whereas the microcontroller 144 scans the signal, for example using an analog-two-digital converter (ADC) installed in the microcontroller 144 and passes the same on over the air.

In embodiments, alternatively or additionally, an acoustic signal can be directed directly to the users (for example a person present) The acoustic signal can, for example, be an acknowledging tone, like beeping once for successful transmission or configuration and beeping twice for a faulty transmission or configuration, or a voice message, for example.

2. METHOD FOR CONFIGURATION

The embodiments of the configuration of the other apparatus 140 described below can also be combined with one another.

2.1. Configuration of Identification and Access Information for Integration in the Communication Network For illustration purposes, the following scenario is assumed. A new apparatus (for example sensor node) is to be linked to a radio communication network. Here, certain network-specific information may be imparted to the apparatus before entering in order for entering to be allowed. This may be an identification number, cryptographic key, communication parameters (for example frequencies, modes, and profiles), etc. In particular in the case of nodes with a unidirectional radio interface (no reception possible), such an integration in networks can take place using variable parameters/parameters not known when producing the node.

2.1.1 Configuration Via Web Interface of Base Station

In embodiments, the base station of the radio network can provide a web interface for the user. The function of configuring new apparatuses (for example sensor nodes) can then be controlled via the web interface. The audio output used here using the browser is possible in virtually all modern mobile phones. Optionally reading QR codes or the microphone (for bidirectional communication) is also possible using the browser.

Example

1. User opens web interface of the base station in the browser of his or her user terminal (for example mobile phone, notebook, tablet computer, etc.) and navigates, if applicable, to the configuration site for new apparatuses.
2. Optionally, further parameters for the apparatus (for example type of apparatus, attribution to subnetworks etc.) can be input and/or information can be read by the user by means of scanning a QR code on the apparatus, for example.
3. Optionally, additional apparatus-specific parameters can be indicated, which are to be communicated to the apparatus simultaneously, like transmission frequency for sensor values, alarm thresholds (transmission is triggered), different operating modes etc., for example.
4. In the web interface, the user is requested to hold his or her user terminal close to the apparatus to be configured.
5. User confirms and starts configuration transmission in the web interface.
6. Transmitting the information to the apparatus to be configured.
7. Acknowledging the configuration performed by base station and/or sensor nodes, for example optically (LED, display etc.) or acoustically (beep tone, voice message etc.).

2.1.2. Configuration Via Website of Manufacturer/Service Provider/Etc.

In embodiments, the configuration website can alternatively also be made available on the Internet by the manufacturer of an apparatus (for example sensor node) or service provider for the network. The user, after logging in, can add apparatuses to his or her account. The procedure is identical to the configuration via the web interface of the base station.

2.1.3. Configuration Via Scanner at the Base Station (Unidirectional Configuration Interface)

In embodiments, an oscillating circuit/loudspeaker can be installed in the base station, wherein the configuration can be made directly at the base station.

Example

1. User holds new apparatus (for example sensor node) close to the base station.
2. User actuates configuration scanner at the base station.
3. Base station transmits relevant parameters to the sensor node.
4. Optionally, the sensor node confirms configuration by radio transmission to the base station (normal radio interface)
5. Acknowledging the configuration performed by base station and/or sensor node, for example optically (LED, display etc.) or acoustically (beep tone, voice message etc.)

2.1.4. Configuration Via Scanner at the Base Station (Bidirectional Configuration Interface)

In embodiments, the configuration interfaces in the sensor node and the base station can be bidirectional. In this case, data can also be transmitted from the sensor node to the base station via the configuration interfaces.

Example

1. User holds new apparatus (for example sensor node) close to the base station.
2. User actuates configuration scanner at the base station.
3. Base station requests information from the sensor node via the configuration interface.
4. Sensor node transmits relevant parameters to the base station.
5. Optionally, the sensor node confirms configuration by radio transmission to the base station (normal radio interface).
6. Acknowledging the configuration performed by the base station and/or the sensor node.

2.1.5. Outputting Prepared Configuration

In embodiments, configuration signals for one or more apparatuses can be pre-generated centrally (for example during manufacturing or network planning etc.). The signals can exemplarily be generated as audio files and then be reproduced using different reproduction apparatuses in order to perform the transmission at the apparatus to be configured. Ideally, non-compressed or lossless formats are to be selected for this. These audio files can exemplarily also be transmitted via messaging services or via email.

Example

1. Configuration information are produced centrally in network planning and stored as audio files.
2. Audio files are loaded onto reproduction apparatuses of the installing persons (special reproduction apparatuses or smartphones, PDAs, MP3-players present anyway etc.).
3. Installing persons attach apparatus to be configured, hold the reproduction apparatus close to the apparatus to be configured and play the pre-generated audio file.
4. Acknowledging the configuration performed can, for example, be performed by an LED or beep tone.

2.1.6. Configuration Via Telephone Link

In embodiments, reproducing a configuration signal can be performed via a telephone link. However, the restriction due to compression and distortion etc. must be kept in mind. The signal can, for example, use only frequencies in the range of the human voice and leave out psycho-acoustic filter ranges of compression algorithms.

Example

1. Customer calls the hotline of a provider to report a problem with his or her apparatus.
2. Service employee can generate a suitable configuration for the apparatus and request the customer to hold the telephone receiver or the mobile phone close to the apparatus.
3. Service employee reproduces the configuration directly via the telephone.
4. Acknowledging the configuration performed can, for example, be performed by a beep tone.

2.2 Amending Security-Relevant Information

For illustration purposes, the following scenario is assumed. An apparatus (for example sensor node) is purchased from a store, the manufacturer or a previous user. It cannot be ensured that pre-configured identification numbers or cryptographic keys are not known to third parties. This means change of this security-relevant information.

The configuration may, for example, only be allowed within a time window of a few minutes after reset by disconnecting the current supply (remove batteries and insert them again, etc.) to make reconfiguration by unauthorized persons more difficult (battery for example, installed, screwed etc. in apparatus). In addition, when resetting, all the previous parameters can be erased in order to prevent reading out previous parameters (in bidirectional configuration interface).

A later change of the configuration without reset can only be allowed with an authentication and/or encryption based on the initial configuration. If a sensor node was, for example, initially configured via the web interface of a base station, the base station can, when changing the configuration, access the initial information and correspondingly authenticate and/or encrypt the new configuration.

In order to avoid tapping/picking up the new configuration during transmission by third parties (in direct proximity), in the case of a bidirectional configuration interface, an established method for key handling (for example Diffie-Hellman, RSA, etc.) and subsequent encrypted transmission can be used. In the case of a unidirectional configuration interface, an initial key (is active when delivered/reset) which is known or applied on the sensor node can be used.

Example

1. User newly inserts battery or shortly disconnects battery from the apparatus.
2. User opens an app or website for the apparatus configuration.
3. Optionally, the app or website produces suitable and new parameters.
4. Optionally, the user selects/edits parameters explicitly.
5. User holds mobile phone close to the apparatus and starts configuration.
6. Optionally, key handling in the case of bidirectional configuration interface.
7. Transmitting the parameters from the mobile phone to the apparatus.
8. Optionally, feedback by the apparatus in the case of bidirectional configuration interface.
9. Acknowledging the configuration by apparatus and/or mobile phone.

2.3. Configuration of Apparatus Parameters

For illustration purposes, the following scenario is assumed. The operating parameters of an apparatus are to be configurable by the user. Either, the apparatus does not have any suitable operating elements or configuration is easier/faster to realize using a mobile phone. These may also be apparatuses not able to communicate (apart from the configuration interface) (for example watches, alarm clocks, info displays etc.). The time, for example, can be distributed quickly and easily from the mobile phone (obtains correct time via mobile radio network or Internet) to watches (time shift etc.).

Example

1. User opens app or website for apparatus configuration.
2. Optionally, the user selects and/or edits parameters to be configured.
3. User holds mobile phone close to the apparatus and starts the configuration.
4. Transmitting the parameters from the mobile phone to the apparatus.
5. Optionally, feedback by the device in the case of bidirectional configuration interface.
6. Acknowledging the configuration by the apparatus and/or mobile phone.

3. ACTIVATION BY MAGNETIC COUPLING

In embodiments, the other apparatus 140 can comprise a microcontroller 144 and an LC resonant circuit 142 for detecting the magnetic signal 130, wherein the LC resonant circuit 142 can be connected directly to an input or inputs of a comparator of the microcontroller 144. Responsive to an interrupt can of the comparator, the microcontroller 144 can switch from an operating mode at reduced current consumption to a normal operating mode.

In embodiments, an interrupt at a microcontroller 144 can be triggered very easily by magnetic coupling. This allows setting the microcontroller 144 to a current-saving state and waking up the same by an activation signal via magnetic coupling. In a second step, data transmission may, for example, take place by means of a conventional near-field transmission technology (NFC etc.). The transmitter/receiver for the data transmission does not have to be activated permanently and the current consumption in an idle state can be reduced.

Alternatively, a different action can be triggered by the activation signal, like setting an apparatus to an active state, causing emission of a radio transmission etc. Thus, an encapsulated apparatus (watertight etc.), for example, can be switched on without any special sealed operating elements, the current consumption in the switched-off state being minimal.

4. FURTHER EMBODIMENTS

Although some aspects have been described in the context of an apparatus, it is clear that these aspects also represent a description of the corresponding method, such that a block or device of an apparatus also corresponds to a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically tangible and/or non-volatile or non-transitory.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be universally applicable hardware, such as a computer processor (CPU), or hardware specific for the method, such as ASIC.

The apparatuses described herein can, for example, be implemented using a hardware apparatus, or using a computer, or using a combination of a hardware apparatus and a computer.

The apparatuses described herein, or any components of the apparatuses described herein, can be implemented, at least partly, in hardware and/or in software (computer program).

The methods described herein can, for example, be implemented using a hardware apparatus, or using a computer, or using a combination of a hardware apparatus and a computer.

The methods described herein, or any components of the methods described herein, can be executed, at least partly, by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for transmitting data between a user terminal and another apparatus, the method comprising:
   generating a signal for driving an electromagnetic functional unit, the electromagnetic functional unit being an actuator of a loudspeaker of the user terminal or the electromagnetic functional unit being an electromagnetic oscillating circuit connected to the user terminal,
   driving the electromagnetic functional unit by the generated signal to produce, by the electromagnetic functional unit, a magnetic signal which carries first data to be transmitted from the user terminal to the other apparatus,
   detecting another signal output by the other apparatus, the other signal carrying second data to be transmitted from the other apparatus to the user terminal,
   wherein the magnetic signal and the other signal differ in the physical signal type;
   wherein the first data are configuration data for configuring the other apparatus,
   the method further comprising detecting the magnetic signal by an electromagnetic oscillating circuit of the other apparatus to receive the first data,
   the method further comprising configuring the other apparatus based on the received first data.

2. The method in accordance with claim 1, wherein data are transmitted from the other apparatus to the user terminal exclusively via a signal which differs from the magnetic signal in the physical signal type.

3. The method in accordance with claim 1, wherein no magnetic signals are transmitted from the other apparatus to the user terminal.

4. The method in accordance with claim 1, wherein the other signal is output from the other apparatus responsive to the magnetic signal.

5. The method in accordance with claim 1, wherein the other signal is an optical signal, acoustic signal or electromagnetic signal.

6. The method in accordance with claim 1, wherein the other signal is detected by the user terminal or by an apparatus connected to the user terminal.

7. The method in accordance with claim 1, wherein the other signal is an acoustic signal, wherein the acoustic signal is detected by means of a microphone of the user terminal or a microphone connected to the user terminal to receive the second data which the acoustic signal carries.

8. The method in accordance with claim 7, wherein the acoustic signal is output by means of an acoustic signal generator of the other apparatus.

9. The method in accordance with claim 8, wherein the acoustic signal generator is a loudspeaker, buzzer, beeper or piezo disk.

10. The method in accordance with claim 1, wherein the electromagnetic functional unit is an electromagnetic oscillating circuit connected to the user terminal,
    wherein the electromagnetic oscillating circuit is connected to the user terminal via an audio interface of the user terminal, or wherein the electromagnetic oscillating circuit is connected via an audio interface of a wireless audio adapter connected to the user terminal.

11. The method in accordance with claim 1, wherein configuring the other apparatus comprises connecting the other apparatus to a communication network using the received first data.

12. The method in accordance with claim 1,
wherein the other apparatus switches from an operating mode at reduced current consumption to a normal operating mode responsive to detecting the magnetic signal,
the method further comprising transmitting a further signal, the further signal carrying third data to be transmitted from the user terminal to the other apparatus,
wherein the magnetic signal and the further signal differ in the physical signal type.

\* \* \* \* \*